United States Patent Office 3,426,837
Patented Feb. 11, 1969

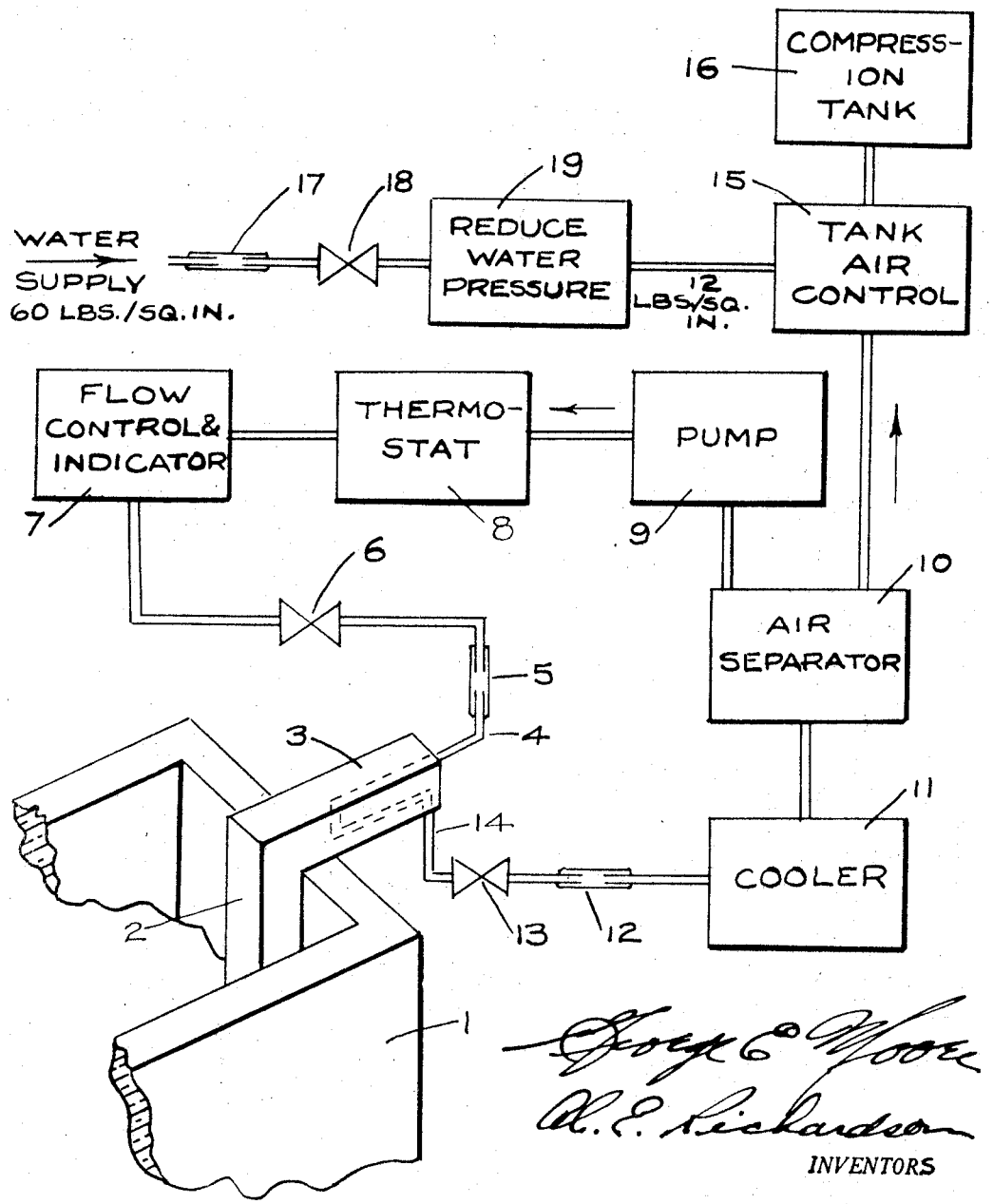

3,426,837
SEALED RECIRCULATING COOLING SYSTEM
George E. Moore and Al E. Richardson, Farmington, Mich., assignors to Sun Steel Treating Incorporated, Farmington, Mich.
Filed Dec. 27, 1966, Ser. No. 605,069
U.S. Cl. 165—47
Int. Cl. F28f 27/00; F28d 7/00; F28c 3/04
4 Claims

ABSTRACT OF THE DISCLOSURE

A closed or sealed liquid cooling system including in series a cooler; air separating means connected to a compression tank to provide the desired pressure in the system; a pump to circulate the liquid; flow control means to regulate circulation of the cooled and deaerated liquid to the heated member whereinafter the cycle is completed by returning the heated liquid to the cooler.

---

This invention relates to an improved cooling system which is more efficient, and is less costly to operate in cooling electrodes for molten salt baths. More particularly, this invention relates to a closed circuit water cooling system for electrodes and the like in which the air is removed from the system and wherein the pump is located in the supply portion of the circuit.

High temperature salt baths are generally heated by the resistance of the salt to the passage of a current between electrodes which conduct current into the salt. The electrodes may be of the immersed or "over the top" type or the electrodes may be of the submerged type wherein the electrodes are built into the brickwork of the salt reservoir.

A typical installation used for the heat treatment of high speed steel tools would consist of one or more preheat salt baths, a high heat salt bath and a quench salt bath. The salt baths used for heating consist essentially in a reservoir for holding the molten salt, together with electrodes to provide for heating the salt by its resistance to the passage of current therethrough and a suitable means for indicating and controlling the temperature of the salt. This can be accomplished with radiation pyrometers and thermocouples.

Current is furnished to the electrodes by means of a saturable core reactor and a transformer. In one of several salt bath installations in a commercial heat treating plant operated by the applicants, line voltage at 4800 volts is fed into the reactor where it is converted to 396 volts. This in turn is fed into a transformer which delivers 2400 ampere current at 24 volts to the electrodes to provide for resistance heating the salt.

It is necessary to cool the electrodes by passing water through that portion of the electrode which is connected to the current supply. Without cooling, excessive heating will occur along with excessive voltage and current fluctuations. In the conventional method of cooling electrodes, tap water is circulated through the leg of one electrode and it is then passed through a rubber hose to the leg of the other electrode after which the water flows to a drain.

It is common practice to use a flow rate of about 2½ gallons per minute per salt bath to cool the electrodes. It has been our experience that this is inadequate for cooling and it is not uncommon to find that the water-cooled legs of the electrodes heat up to about 130° to 150° F. or higher. We find that about eight times this flow rate, or about ten gallons per minute per electrode, or 20 gallons per minute per salt bath, will provide for an adequate cooling system using a ½ inch diameter passage in the electrode for the flow of water. We believe that the reason for low rate of flow of cooling water used in conventional systems is due to the expense involved with allowing the water to run down the drain.

As will be explained more fully hereinafter, we have developed a closed circuit cooling system which provides for adequate, low cost, trouble-free cooling. It is therefore an object of this invention to provide a closed circuit water cooling system for electrodes and the like in which air is removed from the system.

It is also an object of this invention to provide a closed circuit cooling system which provides satisfactory cooling at a fraction of the operating costs of conventional cooling systems.

It is also an object of this invention to provide a cooling system for electrodes and the like where deposits of hard minerals or corrosive materials is substantially avoided.

It is also an object of this invention to provide an efficient cooling system for salt bath electrodes which utilizes a flow rate of about ten gallons per minute per electrode and which results in a very substantial saving in cooling water.

Other objects and advantages of our invention will be readily appreciated by reference to the following detailed description and illustrations.

We have found many disadvantages with the conventional cooling system used for cooling electrodes. Not only is the cooling inadequate but operating costs are also excessive.

In this connection, consider a salt bath installation utilizing two preheating salt baths and one high heat salt bath. Using a flow rate of 20 gallons per minute per salt bath to provide satisfactory cooling, such an installation will use 2,592,000 gallons of cooling water per month. If this is allowed to run down the drain, the cost of the water based on a cost of thirty-five cents per 1,000 gallons will be $898.20 per month. It should be pointed out that the figures cited are conservative and in many sections of the country the cost of water is considerably higher.

Another difficulty with the conventional cooling system used on salt bath electrodes is that the cooling water can short-circuit the current. This not only results in a potentially dangerous condition but there is also a loss in efficiency. We have found a six ampere loss with a water connection between the electrode due to current leakage through the cooling water.

Another difficulty with the conventional water cooled electrode is that hard mineral deposits will build up from hard water in the cooling passages. After three months of operation, which is considered a normal electrode life for the overhead type electrode, deposits with hard water will plug about ⅓ of the cooling passage in the electrode. With soft waters, the buildup or deposit is of a different nature and consists in a buildup of corrosive materials.

We have found that the difficulties with conventional cooling methods used for electrodes can be avoided with very satisfactory results and with very little operating expense by utilizing an improved closed cooling system which we have designed.

We first used a closed cooling system for both electrodes. This arrangement is considerably more effective than cooling systems which pass water through the electrodes and discharge the water down the drain. However, we find a further improvement in providing a separate closed cooling system for each electrode so that there is no electrical path between the electrodes with a loss of current. Therefore, the preferred method of cooling the electrodes involves the provision for a separate closed cooling system for each electrode.

In designing a closed cooling system for each electrode or a common system for both electrodes, we find that the air must be substantially removed from the water.

With air in the system, the pump is forced to propel a partly compressible mixture of water and air resulting in an inefficient system. The presence of air causes excessive vibration in the pump with premature failure of the bearings and seals. In fact, we have found that the life of the pump is at least doubled by eliminating air from the system. Also with the elimination of air, we find that the cooling characteristics of the system is greatly improved. We do not wish to be bound by any theory as to the mechanism of operation of the improved cooling process of our invention, but it is our belief that the heat transfer characteristics or conductivity of the water is greater when air is removed from the water.

The separated air is fed to a compression tank which serves to provide adequate pressurization for the system.

We find it advantageous to pump water from which the air has been removed. The pump provides the pressure to circulate the water through the passages in the legs of the electrodes after which the heated water passes to a cooler to reduce its temperature for further cooling.

To demonstrate the results obtained when proceeding according to our invention, a detailed illustration and discussion of the closed cooling system will be included herewith.

The essential elements of the improved cooling system is illustrated schematically in the block diagram. In the diagram, a separate cooling system is employed for each electrode and a complete system for one of the electrodes is illustrated.

Referring to the drawing, a portion of a salt bath 1 for heating molten salt is shown with one immersed electrode 2, the leg 3 of the electrode 2 is water cooled by cooling water which flow through the electrode leg 3. An inlet pipe 4 feeds the cooling water to the electrode leg 3 and the inlet pipe is insulated with rubber tubing 5 from the balance of the circuit. A shutoff valve 6 and a flow control and indicator 7 are provided to indicate and control the flow of cooling water to the electrode leg 3. A thermostat 8 is provided in the circuit to operate the cooler 11 when the temperature rises beyond a seat point. A pump 9 provides pressure of about 12 lbs. per square inch in the circuit for circulating the cooling water in the system. An air separator 10 removes air from the system so that the pump 9 circulates air-free water to the electrode leg 3 for cooling. The air which is removed from the separator 10 passes to a compression tank 16 which is provided with a tank air control 15 which serves to help confine the air in the compression tank 16. The compression tank 16 serves the important function of providing correct pressurization of the system.

A water supply is introduced at about 60 lbs./sq. in. pressure through an insulator 17, a shutoff valve 18 and a water pressure reducing valve 19 to reduce the pressure to that of the closed system. The heated water, as it passes through the electrode leg 3 returns through the return pipe 14 through the shutoff valve 13 and through a rubber insulator 12 to a cooler 11. The cooler 11 may consist essentially of a radiator with a fan for cooling or if several systems are connected to a common cooler or if additional cooling capacity is desired, a refrigerating unit may be used.

The air separator 10 has a built-in dip tube and a perforated diffuser tube which separates out the air as the velocity of the water is reduced in the unit. For a further description of the detailed construction of an air separator unit which has proved to be satisfactory, reference may be made to U.S. Patent 2,984,460. The separator should have a capacity of about 29 gallons per minute for the system illustrated.

For pumping the cooling water in the system at a pressure of about 12 lbs. per square inch, we have found a high velocity impeller pump to be satisfactory. This should have a capacity of about 20 gallons per minute at a head of about 11 feet of water.

The compression tank 16 should be capable of 125 lbs. per square inch of pressure. This serves to provide adequate pressure to the system.

The tank air control unit 15 helps to confine air in the compression tank and prevents gravity circulation and helps establish the correct initial air pressure in the system.

The water pressure reducing valve 19 is diaphragm operated and serves to reduce the water pressure from line pressure of the system which is 12 lbs. per square inch.

The cooling unit 11 may consist of a fan coil unit often referred to as an evaporator. In an installation which we have made, which is in commercial use, a unit having a capacity of 72,800 B.t.u/hr. has been found to be quite satisfactory. The thermostat 8 controls the cooler 11. For example, when the thermostat is set for 100° F. water in excess of this temperature will start the cooler 11 to operate to reduce the temperature of the cooling water which is above this temperature.

While we have found the fan coil arrangement to be quite satisfactory, a refrigeration unit can be used, particularly if it is desired to use a common cooling unit for several systems.

In addition to the many desirable features of the improved closed loop cooling system for salt bath electrodes, the application of this type of cooling is particularly desirous from the conservation standpoint.

It is estimated that in the United States there are at least 3,000 salt baths used for heating where water cooled electrodes are used. Since each salt bath should require 864,000 gallons of cooling water per month, the adoption of the present system can result in a saving of over 31 billion gallons of cooling water per year. With the present shortage of water, which is becoming more critical every year, a saving of the magnitude indicated appears to be desirable and necessary.

Also in this connection, it should be realized that while a specific cooling installation which relates to salt bath electrodes has been cited, there are many additional cooling applications such as dies in die casting, heating coils and inductor blocks on induction heating, mandrels in the hot extrusion of metals, and many other applications where the principles of our invention can be applied with excellent results.

When all of the applications for cooling are considered, it is conservatively estimated that the potential saving in water consumption can amount to at least 200 billion gallons of water per year.

It will be realized that the important advantages apparent from the preceding description have been obtained in the commercial application of this process. Since certain modifications may be made in carrying out this invention without departing from the scope thereof, it is intended that all matter set forth in the above description and in the drawing and example of a commercial application be interpreted as illustrative and not in a limiting sense.

Having thus described our invention, what we claim and desire to protect by Letters Patent of the United States is:

1. A constant pressure, sealed system for water cooling salt bath electrodes comprising in combination;
   an electrode for introducing current into a molten salt bath;
   said electrode being provided at its nonimmersed end with passage means through which cooling water for the system is circulated;
   conduit means for conducting said water through said system;
   said passage means in the end of the said electrode being connected to said conduit means;
   means connected to said conduit means for pumping said cooling water through the said conduit means and thereby through the said system;
   means connected to said conduit means for maintaining the cooling water under a pressure of about 12 pounds per square inch uniformly throughout the said sealed system;

means connected to said conduit means for removing oxygen and air from the said water;

heat extracting means connected to the said conduit means for removing heat from the said cooling water; and means connected to the said conduit means for supplying the cooled water from the said heat extracting means to the said pumping means for recirculating the said water to the said passage means in the said end of the said electrode.

2. A constant pressure, sealed cooling systems comprising in combination;

a liquid cooling medium;

a member to be cooled, said member being provided with passage means through which the said liquid cooling medium for the said system is circulated;

conduit means for conveying the said liquid cooling medium through the said system, the said passage means in the said member being connected to the said conduit means;

means connected to the said conduit means for circulating the said liquid cooling medium through the said system;

means connected to the said conduit means for removing substantially all of the air from the said liquid cooling medium;

means connected to the said conduit means for maintaining the said cooling medium at a constant pressure throughout the said system;

means connected to the said conduit means for removing heat from the said liquid cooling medium;

means connected to the said conduit means for indicating and controlling the rate of flow of the said liquid cooling medium; and means connected to the said conduit means for recirculating the said liquid cooling medium to the said member to be cooled.

3. The improved, sealed constant pressure cooling system substantially as defined in claim 2, wherein preset temperature control means connected to the said conduit means is included to operably control the means for removing heat from the said liquid cooling medium.

4. A constant pressure, closed cooling system comprising in combination;

a cooling liquid;

a member to be cooled, said member being provided with passage means for the transfer of the said cooling liquid therethrough;

conduit means for conveying the said liquid through the said system, the said passage means being connected to the said conduit means;

circulating means connected to the said conduit means for pumping the said liquid throughout the said system;

means connected to the said conduit means for removing substantially all of the air from the said liquid;

means connected to the said conduit means for maintaining the said liquid at a constant pressure throughout the said system;

heat extracting means connected to the said conduit means for removing heat from the said liquid; and means for recirculating the said liquid from the said heat extracting means to the said member to be cooled.

References Cited
UNITED STATES PATENTS

| | | | |
|---|---|---|---|
| 3,059,913 | 10/1962 | Sands | 165—107 X |
| 3,202,356 | 8/1965 | Gardner et al. | 237—65 X |
| 1,405,281 | 1/1922 | Chapman | 237—68 |
| 1,679,489 | 8/1928 | Page et al. | 165—107 |
| 2,441,416 | 5/1948 | Hopkins | 165—107 X |
| 2,499,782 | 3/1950 | Sabaut | 313—32 X |
| 2,654,581 | 10/1953 | Hillier | 165—1 |
| 2,796,451 | 6/1957 | Halm | 13—18 X |
| 3,108,633 | 10/1963 | Walton | 165—111 X |

FOREIGN PATENTS 937,117   12/1955   Germany.

ROBERT A. O'LEARY, *Primary Examiner.*

ALBERT W. DAVIS, *Assistant Examiner.*

U.S. Cl. X.R.

13—18